United States Patent [19]

Ernster et al.

[11] 4,071,789

[45] Jan. 31, 1978

[54] MULTI-PURPOSE KITCHEN APPLIANCE

[75] Inventors: Peter Jacob Ernster, Glendale; William Joseph Collins, Milwaukee; George Henry Schaefer, Wauwatosa, all of Wis.

[73] Assignee: Oster Corporation, Milwaukee, Wis.

[21] Appl. No.: 661,721

[22] Filed: Feb. 26, 1976

Related U.S. Application Data

[62] Division of Ser. No. 478,905, June 13, 1974, Pat. No. 3,951,351.

[51] Int. Cl.² ............................................. H02K 7/14
[52] U.S. Cl. ....................................... 310/50; 310/83; 366/224; 366/300
[58] Field of Search ....................... 310/47, 50, 90, 89, 310/157, 83, 91, 66, 62, 58, 63, 233, 42; 74/665, 16, 665 GA, 383; 259/1, 104, 105, 108, 82; 318/17

[56] References Cited

U.S. PATENT DOCUMENTS

| 2,278,187 | 3/1942 | Strauss | 259/82 |
|---|---|---|---|
| 2,798,700 | 7/1957 | Corbett | 259/108 |
| 2,807,447 | 9/1957 | Vaughan | 259/105 |
| 2,917,929 | 12/1959 | Sprague | 74/665 GA |
| 3,413,498 | 11/1968 | Bowen | 310/47 |
| 3,418,504 | 12/1968 | Paule | 310/50 |
| 3,432,703 | 3/1969 | Sheps | 310/50 |
| 3,691,407 | 9/1972 | Klett | 310/50 |
| 3,829,721 | 8/1974 | Rosenthal | 310/47 |

Primary Examiner—R. Skudy
Attorney, Agent, or Firm—George R. Clark; Neil M. Rose; Clifford A. Dean

[57] ABSTRACT

A multi-purpose kitchen appliance for performing the functions of food mixing, blending, and the grinding or chopping of food. A power unit includes a low speed and a high speed power delivery shaft at the upper end thereon which are connectable alternatively to a blender vessel or a transversely extending head including gearing to drive a pair of food mixing elements. The head for driving the mixing elements is provided with means for detachably supporting and driving other attachments such as a food grinder. The power unit rests on a base having a laterally extending portion which has a turntable supporting a bowl into which the food mixing elements extend when the transversely extending head is positioned for food mixing. The transverse head is mountable on the power unit in alternate positions so that by connecting the food grinder to the gear train in the head, the chopped food or meat may be delivered to the bowl position on the turntable. The head is provided with means to pivotally connect it to the power unit or to rigidly latch the head in a fixed position with respect to the power unit.

5 Claims, 15 Drawing Figures

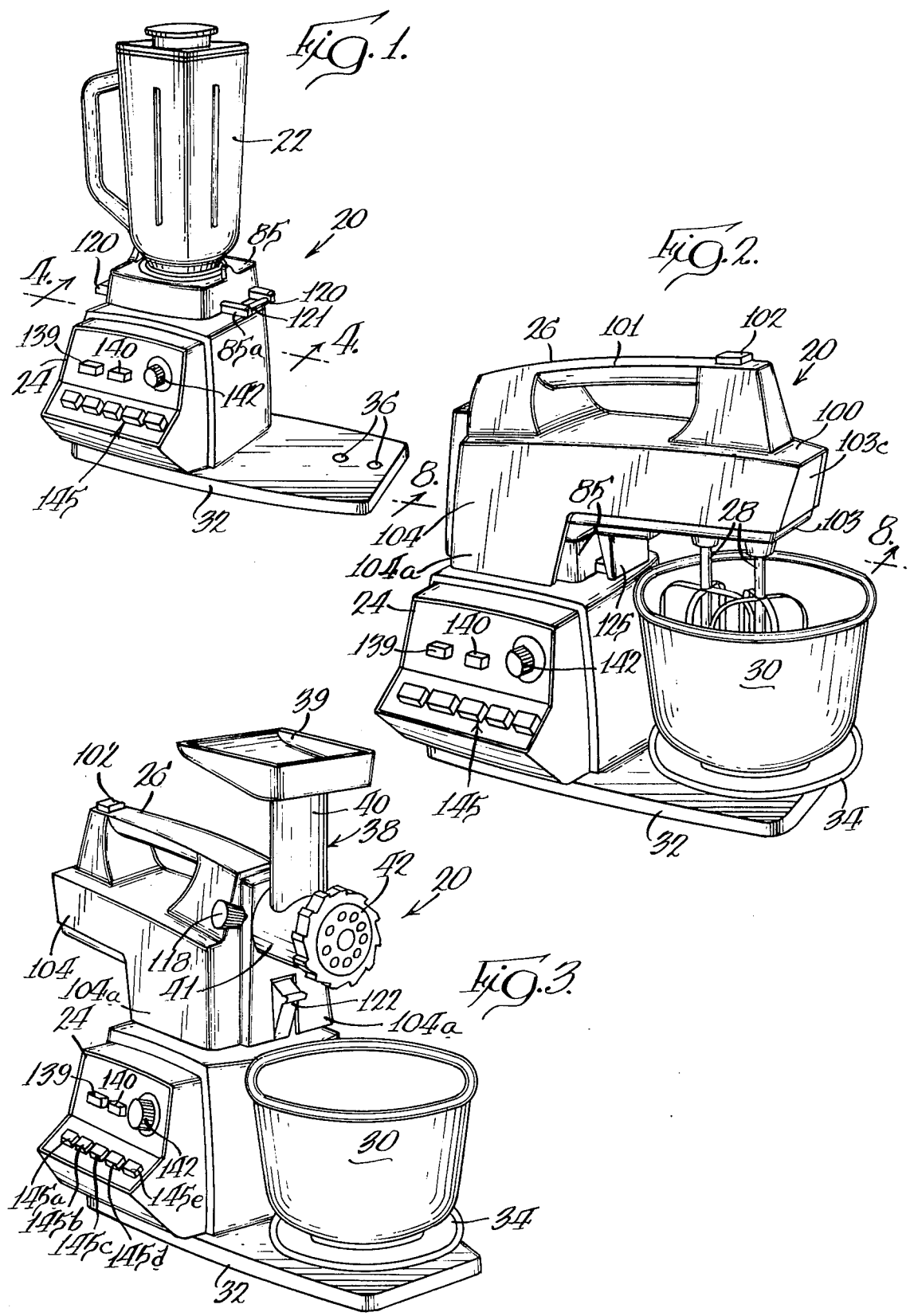

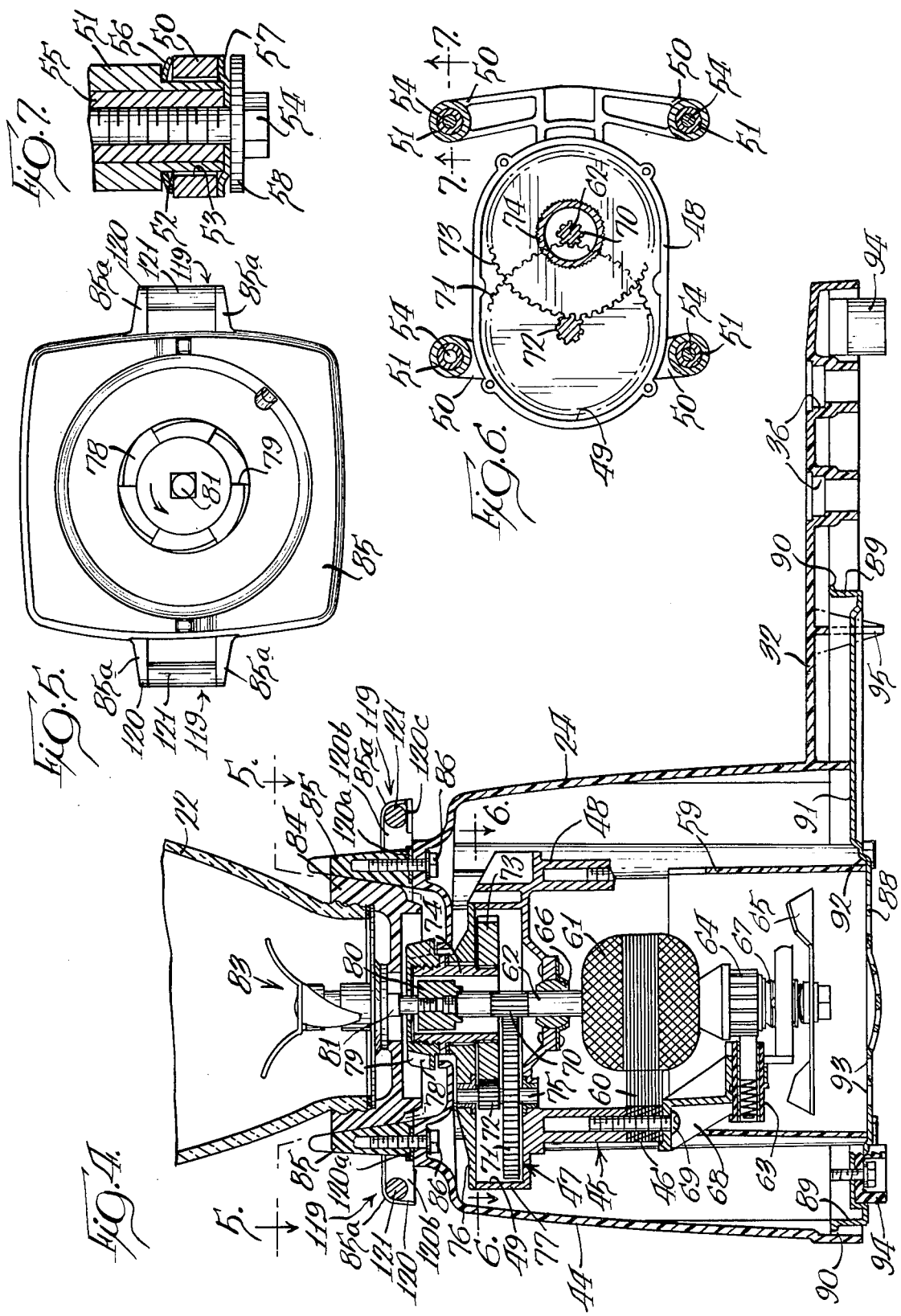

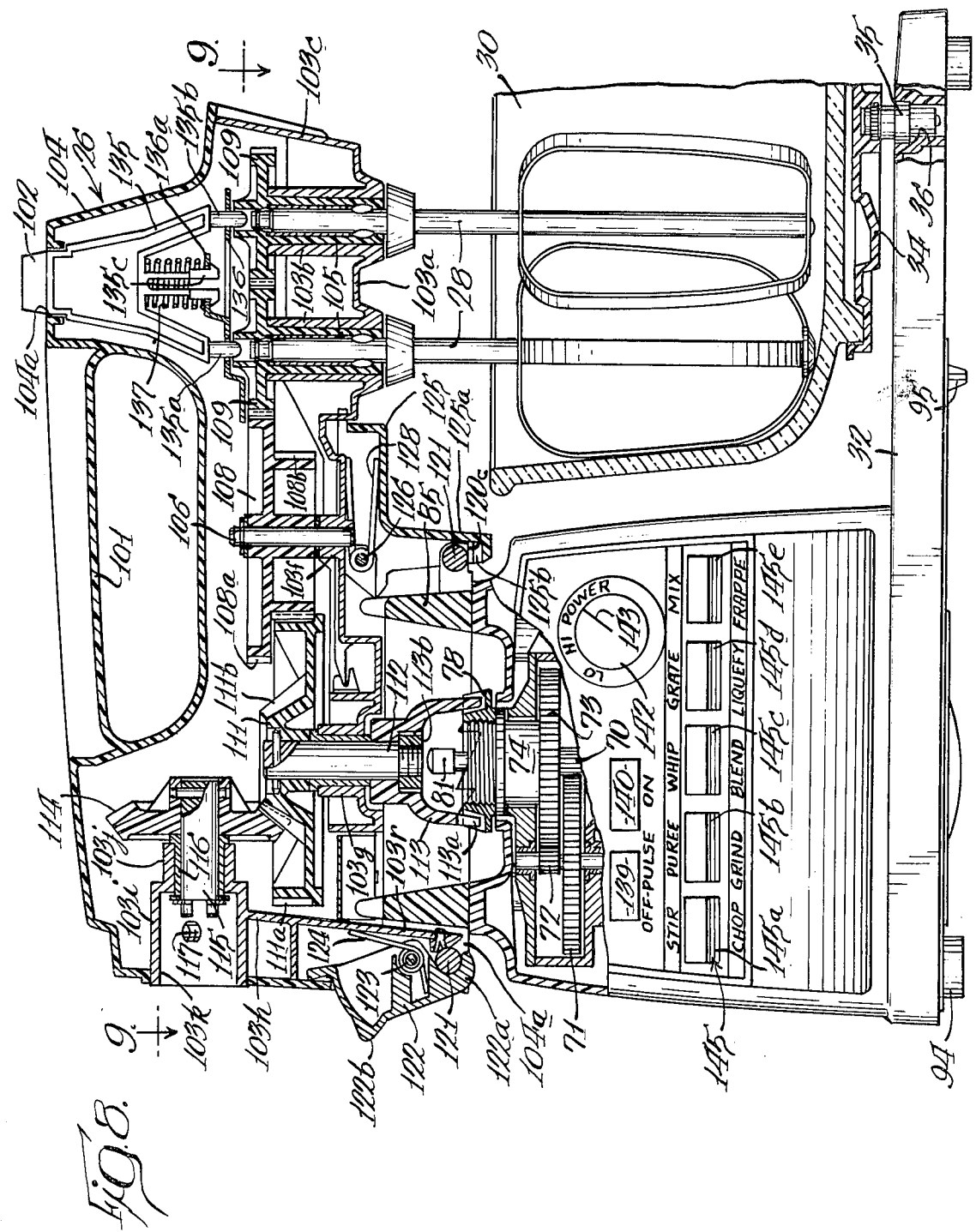

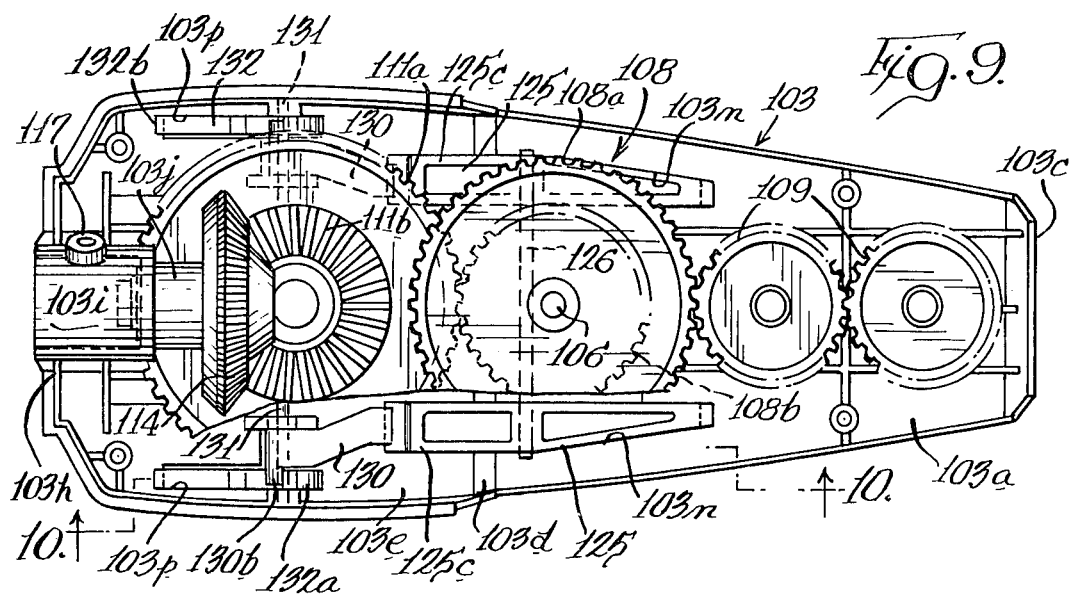
Fig. 9.
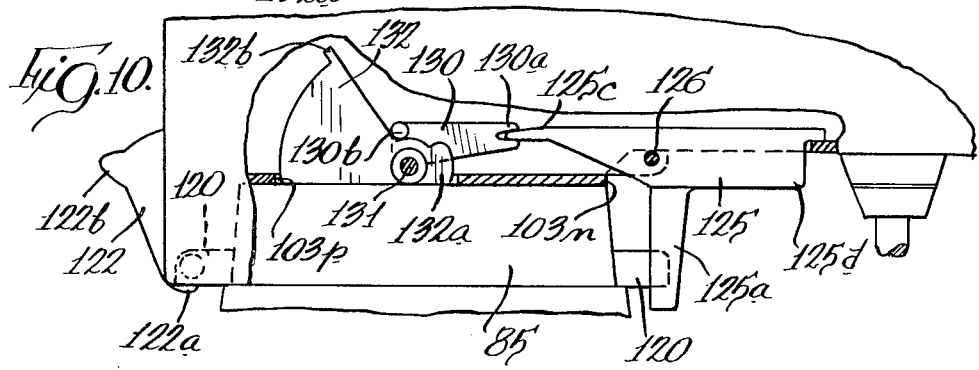
Fig. 10.
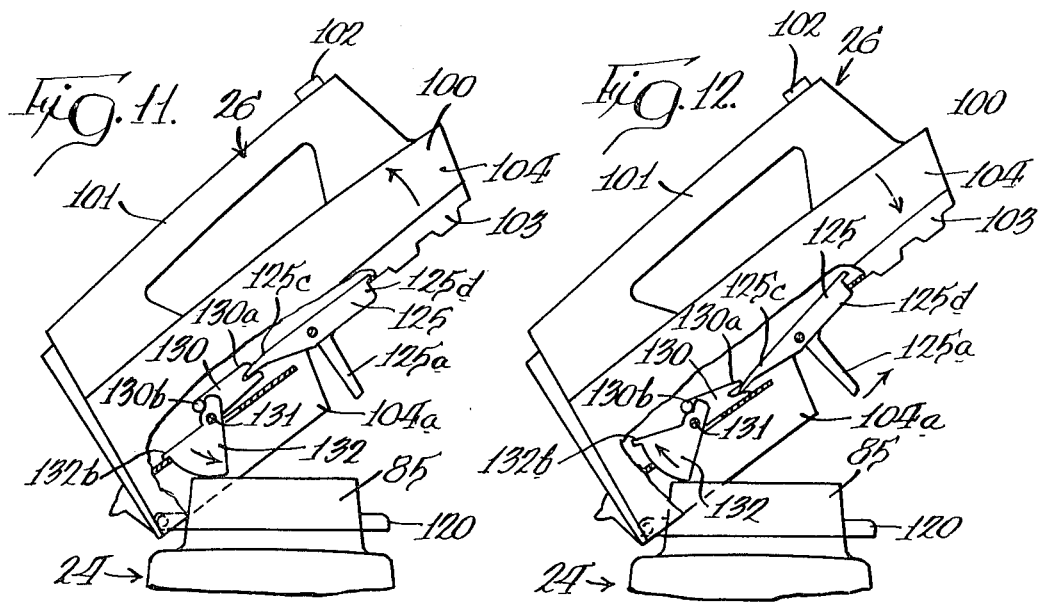
Fig. 11.
Fig. 12.

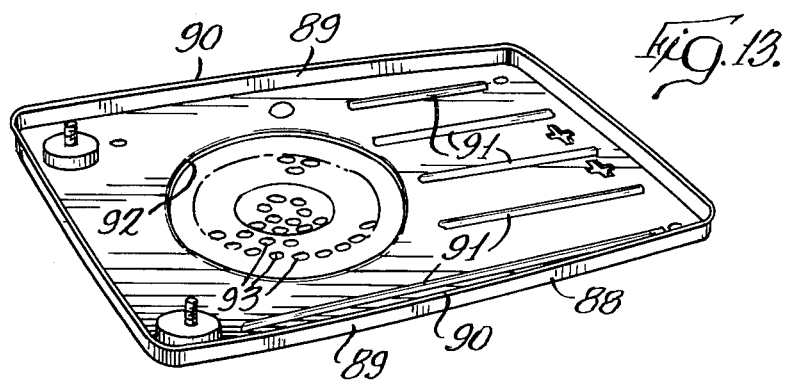
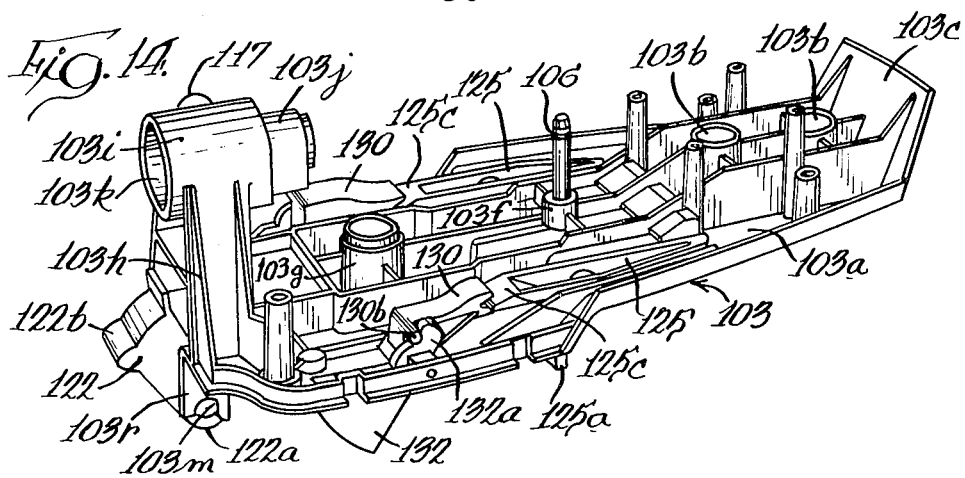
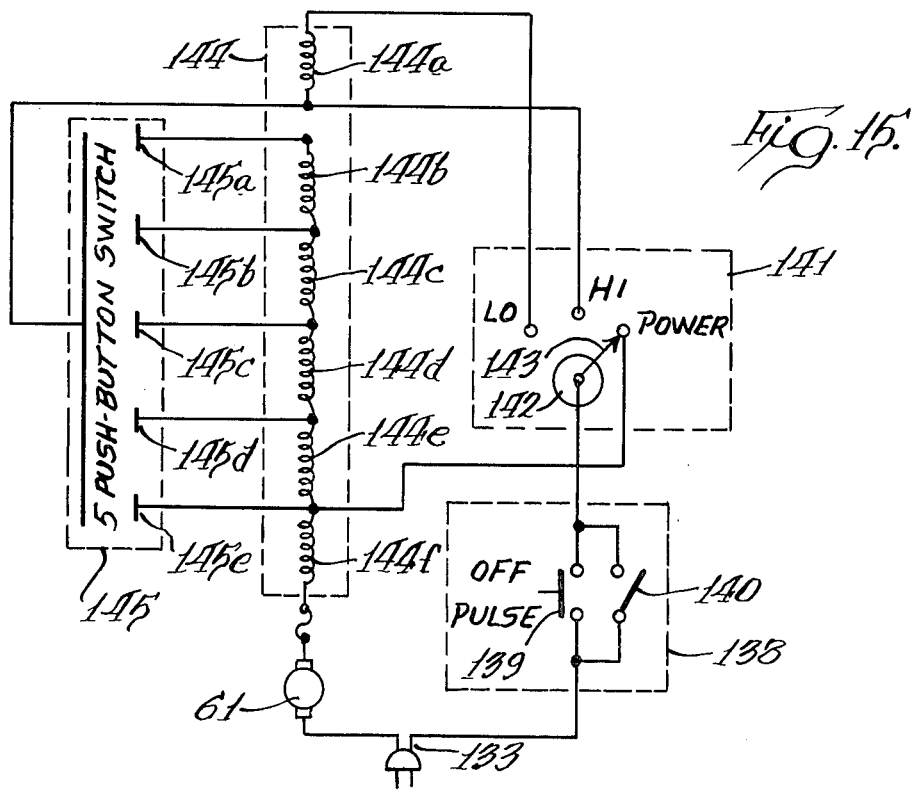

MULTI-PURPOSE KITCHEN APPLIANCE

This application is a divisional application of MULTI-PURPOSE KITCHEN APPLIANCE by inventors, Peter Jacob Ernster, William Joseph Collins and George Henry Schaefer, Ser. No. 478,905, filed June 13, 1974, now U.S. Pat. No. 3,951,351 which was assigned to the assignee of the present invention.

BACKGROUND OF THE INVENTION

There are many examples in the prior art of multi-purpose kitchen appliances which are designed for performing such functions as mixing, blending, juicing, food chopping and the like. None of these prior art multi-purpose appliances have been particularly successful from a commercial standpoint. The reasons for this lack of commercial success relates to the compromises or inadequacies associated with these prior art appliances.

For a multi-purpose appliance to be practical and to appeal to the housewife, it must be arranged so that it may be used to perform any one of its selected functions without substantial conversion or rearrangement of the parts and must perform these functions substantially as effectively as the appliances available for performing these functions separately. The basic problem involved in simply using a common power unit to drive a food mixer, a blender and a food grinder or chopper relates to the differences in power and drive speeds required for these various appliances. The food mixer, for example, must supply a substantial amount of power at variable power speeds from a few hundred RPM to about a thousand RPM. The blender, on the other hand, must be driven at speeds far in excess for those suitable for food mixing, i.e. on the order of as high as 17,000 RPM and finally, a food grinder must supply substantially greater power at very low speeds, i.e. on the order of 150 RPM. None of the prior art appliances have provided a suitable means of coping with these various speed and power requirements.

The patent to Strauss et al U.S. Pat. No. 2,278,187 is an example of a combination mixer and blender wherein the power unit comprises a motor which is disposed with its shaft extending vertically and with a turntable for a mixer bowl disposed on a base extending laterally from the base for the power unit. A head is provided which secures to the top of the power unit and supports beater elements which extend into the mixer bowl. In addition, the power unit is provided with means for supporting a blender vessel connected directly to the motor shaft. In addition, a food grinder is provided which connects to the power supporting head to permit the chopping and grinding of meat and food. The power supporting head in the above-cited Strauss et al patent requires a substantial speed reduction between the output shaft of the power unit and the beater spindles. In addition, there is a further substantial reduction going from the drive for the beater spindles to the drive for the meat chopper. The result was a complex arrangement which included a large number of expensive gears and inefficient worm gearing and resulted in an arrangement which compromised the various power requirements and did not have the attachments arranged for easy use. One of the most significant problems involved in an arrangement such as is disclosed by the Strauss et al patent is providing adequate cooling of the reduction gearing. Since the meat grinder particularly requires a substantial amount of power, there is much heat generated in the gearing with little opportunity for fan cooling of the gears as would be possible if located in the area of the motor.

Other multi-purpose appliances are disclosed in Frank U.S. Pat. No. 2,795,958 which shows a combination mixer, blender and chopper; in Schottle U.S. Pat. No. 2,801,545; Moore U.S. Pat. No. 2,685,435 and Vaughn U.S. Pat. No. 2,807,447 which show a combination blender and mixer; and in Sprague U.S. Pat. No. 2,917,929 and Corbett et al U.S. Pat. No. 2,798,700 which show power units for use with various types of appliances. The patent to Sprague is of interest in teaching the broad idea of providing a power unit having two output shafts which are concentric to each other with one providing a relatively high speed output and the other providing a relatively low speed output. Another prior art patent of interest directed to a combination mixer and blender is Australian Pat. No. 151,296 which shows the blender adapted to be driven from a shaft extending from one end of the mixer housing.

BRIEF DESCRIPTION OF THE INVENTION

The invention comprises a multi-purpose appliance having attachments which adapt it for food mixing, food blending and food grinding. The common power unit for these various attachments includes a housing with a motor mounted therein with the armature shaft extending vertically and with a base which extends laterally from the motor enclosing portion of the power unit and supports a turntable for a mixer bowl. Contained within the housing is an assembly including the motor and a gear reduction which is supported from the top wall of the housing. The motor shaft extends through the top of the housing where it is provided with a coupling suitable for driving the blade assembly in a blender vessel. Positioned concentrically with the blender drive coupling is a second coupling which is driven at a reduced speed from the output of the above-mentioned gear reduction. This last mentioned coupling is the drive for the detachable mixer head. Means are provided on the top of the power unit to rigidly latch the mixer head in a position extending transversely of the power unit and overhanging the turntable and mixer bowl with the mechanism in the mixing head coupled to the slow speed output of the power unit. The mixing head may be unlatched on one side of the power unit so that it may be pivoted through an arc of 40° or so with respect to the power unit to elevate or remove the beater elements from the mixing bowl. Means are provided to retain the mixing head in this elevated position. These retaining means may be disabled by operating a latch means to return the mixing head to a horizontal position.

The mixing head is also adapted to be mounted in an alternative position where the overhanging portion of the mixing head extends outwardly of the power unit in a direction away from the mixing bowl. The mixing head is provided with means for mounting a food grinder on the end of the mixing head away from the overhanging portion. Thus when the mixing head is mounted in the last described alternative position, the food grinder is positioned to deliver the chopped food into the mixing bowl positioned on the turntable.

Contained within the mixing head is a gear train which is driven by the slow speed coupling and which at the output drives a pair of beater spindles which support the beater elements in spaced parallel relationship extending downwardly into the mixing bowls. The gear train in the mixing head includes three spur gears which step up the speed so as to drive the mixer spindles at a higher speed than the speed of the low speed drive from the power unit. The gear trains, both in the power unit and in the mixing head, are comprised of inexpensive spur and helical gears giving an efficient transfer of power between the motor and the mixing elements with a minimum of heat generation.

For the purpose of providing low speed power to the food grinder or chopper, there is a separate bevel gear reduction from the initial gear of the mixing head gear train to the output shaft which drives the food grinder. One of the bevel gears of this set is formed integrally with the first spur gear of the drive train. The bevel gear is of much smaller diameter than the spur gear and is recessed in the upper face thereof.

The power unit is provided at its upper end with a ring which supports the blender vessel and the transversely extending mixer head. For the purpose of supporting the mixer head, there are two metal pins which serve as pivotal supports for the mixing head in the two alternative positions in which it may be mounted on the power unit. The mixing head has at one end a downwardly extending projection which has notches to engage one of the pivot pin supports and has a spring biased lever which clamps around the lower edge of the pin to pivotally secure the mixing head to one of the two pins. Located at approximately the mid-point of the lower face of the mixing head, there is a lever which looks somewhat T-shaped in profile having a downwardly extending leg which is provided with an inwardly facing pocket to receive the other one of the two support pins. This T-shaped lever is pivotally supported with respect to the mixing head and is biased in a direction to engage the pocket in the lower end of the lever with the other of the pivot pin supports to lock the mixing head against pivotal movement with respect to the power unit.

Means are provided to support the mixing head in an inclined position angled upwardly from its normal position of use. This means consists of a pair of stop levers pivoted to the mixing head and engageable with the support ring to retain the mixing head in the raised position. These stop levers are pivoted by gravity as the mixing head is moved to the upwardly angled position. In order to return the mixing head to its horizontal or use position, it is necessary to deflect the T-shaped lever which has a portion extending into the housing and, through a connecting linkage, pivots the stop levers so that the mixing head may be lowered. The same pivotal movement which is necessary to disengage the stop levers is also effective to unlatch the T-shaped lever from the support pin and permit it to be pivoted to the raised position.

The beater elements in the mixing head are provided with a beater ejector which comprises an inverted U-shaped member with the downwardly extending legs thereof engaging the beater elements through openings in the beater spindles and with the bight portion thereof provided with an operating button which extends through and is guided by an opening formed in the upper wall of the mixing head housing.

It is an object of the present invention to provide an improved multi-purpose kitchen appliance which is easy to operate and performs its various functions effectively.

It is a further object of the present invention to provide an improved kitchen appliance which performs the food mixing, food blending and food chopping functions effectively with a minimum conversion necessary to perform the various functions.

Another object of the present invention is to provide an improved multi-purpose appliance having a power unit provided with a base for supporting a bowl and a transversely extending mixing head which is connectable to the top of the power unit in any one of two alternative positions and permitting the mixing head to be either fixedly attached to the power unit or pivotally connected thereto.

It is another object of the present invention to provide an improved multi-purpose kitchen appliance having a power unit with two concentric output shafts, one of which rotates at a high speed for driving the blades of a blender vessel and the other of which rotates at a slow speed for driving a food grinder at a slow speed and driving food mixing beaters at a slow speed.

Still another object of the present invention is to provide an improved multi-purpose appliance having a power unit adapted to drive either a blender or a mixing head which supports a pair of beater elements and a food grinding attachment and which is pivotally connected to the power unit so that it may be latched in an operative position or latched in a raised or retracted position and pivoted therebetween.

Still another object of the present invention is to provide an improved power unit for a multi-purpose appliance including a motor and gear reduction supported within the housing from the top thereof to be aligned with the output shaft and the vessel supported therein.

Further objects and advantages will become apparent as the following description proceeds and the features of novelty which characterize the invention will be pointed out in the claims annexed to and forming a part of the specification.

BRIEF DESCRIPTION OF THE DRAWINGS

FIG. 1 is a perspective view of the multi-purpose kitchen appliance comprising our invention with the blender position on the power unit;

FIG. 2 is an enlarged perspective view of the power unit of FIG. 1 but with the mixing head and the bowl and turntable in position on the power unit;

FIG. 3 is another perspective view of the multi-purpose appliance of FIGS. 1 and 2 but with the mixing head in its alternative position as compared to FIG. 2 and with the food grinding attachment secured to the mixing head;

FIG. 4 is an enlarged sectional view taken on line 4—4 of FIG. 1;

FIG. 5 is a partial sectional view taken substantially on line 5—5 of FIG. 4;

FIG. 6 is a fragmentary sectional view taken substantially on line 6—6 of FIG. 4;

FIG. 7 is an enlarged fragmentary sectional view taken on line 7—7 of FIG. 6;

FIG. 8 is an enlarged view partially in section taken substantially on line 8—8 of FIG. 2;

FIG. 9 is a sectional view of the mixing head taken substantially on line 9—9 of FIG. 8;

FIG. 10 is a somewhat schematic view taken along line 10—10 of FIG. 9 and limited to a showing of the linkage interconnecting the latch with the stop members for retaining the mixing head in the raised position;

FIG. 11 is a view similar to FIG. 10 but showing the action of the stop lever as it is pivoted by gravity to the retaining portion as the mixer head is raised;

FIG. 12 is similar to FIG. 11 but shows the manner in which the latch is actuated to retract the stop levers and permit the mixing head to be moved to its lowermost or horizontal position.

FIG. 13 is a perspective view of the closure plate for the bottom of the power unit housing;

FIG. 14 is a perspective view of the base casting for the mixing head with the gear train removed therefrom; and FIG. 15 is a schematic diagram of the wiring and controls for the power unit.

Referring to FIGS. 1, 2 and 3, there is shown a multi-purpose appliance designated generally by reference numeral 20. In these three figures, the appliance 20 is shown set up for its various modes of operation. In FIG. 1, the appliance 20 is shown with a blender vessel 22 positioned on top of and arranged so as to be driven by a power unit 24. In FIG. 2, the appliance 20 is shown with a mixing head 26 supported on the power unit 24. As indicated in FIG. 2, the mixing head 26 includes means for supporting a pair of mixing elements or beaters 28 which extend from the outer end of the mixing head 26 and are received within a bowl 30. For the purpose of supporting the appliance 20 including the power unit 24 there is provided a base 32 which has a portion which extends laterally with respect to the power unit 24 and supports a bowl turntable 34. As is well known in the mixer art, the turntable 34 includes a ball bearing support 35 which is received in a hole 36 as is shown in FIG. 8. As is indicated in FIG. 1, there may be several holes provided to permit the turntable 34 to be located in alternative positions depending on the size of the bowl 30 being used so that the beater elements 28 may be positioned adjacent the side wall of the bowl as best shown in FIG. 8.

Referring to FIG. 3, the appliance 20 is shown as it would be set up to operate as a food grinder or food chopper. To perform this function, there is provided a food grinding attachment 38 which is supported on the end of the mixing head 26 remote from the end on which the beaters 28 are mounted. The food grinding attachment is entirely conventional including a food receiving hopper 39 from which food is fed through a delivery chute 40 to a screw positioned within a housing 41. The screw is rotated so as to force the food toward the discharge end of the attachment where there is a chopping blade and a plate 42 through which the chopped food is extruded. As shown in FIG. 3, the food discharged through plate 42 falls downwardly into the bowl 30.

When the appliance 20 is used to grind meat, i.e. with the food grinding attachment 38, the mixing head 26 is reversed 180° from the position shown in FIG. 2 as far as its mounting with respect to the power unit 24 is concerned. As will be explained in greater detail below, there are latch means associated with the head 26 and the power unit 24 which permit the head to be mounted in these two alternative positions. In this way, the same bowl support comprising the turntable 34 and the base 32 may be used to support the bowl 30 whether the appliance 20 is used in the mixing mode as shown in FIG. 2 or the food grinding mode as shown in FIG. 3. In all three modes of operation as shown in FIGS. 1, 2 and 3, the power unit 24 operates to drive the appliance in performing its various functions.

In organizing the description of the appliance 20 and its functions, attention will be directed first to the blender form as shown in FIG. 1. The power unit 24 includes a somewhat inverted cup-shaped housing 44 which includes a motor and gearing assembly 45 which provides the rotary power for driving the appliance in any of its three modes of operation. The motor and gearing assembly 45 is made up of a motor 46 and a reduction gear train 47.

In order to support the assembly 45 and partially enclose the gear train 47, there is provided a die cast frame member 48 which is shown in section in FIG. 4 and in plan view in FIG. 6. The die cast frame member 48 includes an upwardly facing pocket or recess 49 in which the reduction gearing 47 is received. At the corners of the portions defining the pocket or recess 49, there are mounting ears 50 through which integrally molded support posts 51 extend downwardly from the top wall of the housing 44 as shown in FIGS. 6 and 7. As is evident from FIG. 7, the posts 51 are provided with shouldered ends 52 of reduced diameter which extend through openings 53 in the ears 50. There is a considerable amount of clearance provided between the inside diameter of the holes 53 and the ends 52 which extend therethrough. To complete the assembly of the die cast frame member 48 to the housing posts 51, there are provided assembly bolts 54 which are threadedly received in inserts 55 molded into the posts 51. Each of the spring washers 56 and 57 positioned between the ears 50 and the posts 51 and the rigid washer 58 permit the motor and gearing assembly 45 to move or align itself with respect to the housing 44 for reasons to be explained in greater detail below.

The motor 46 includes a laminated field 60, an armature 61 supported by shaft 62 and a pair of brush assemblies 63 which are associated with a commutator 64. Mounted on the lower end of the armature shaft 62 is a fan 65 which circulates air upwardly into the housing 44 across the motor 46 and the die cast frame member 48. A suitable cylindrical baffle 59 is provided to form a shroud around the fan and to direct the cooling air from the fan 65 across the motor 46 and the die cast frame member 48.

The armature shaft 62 is supported on an upper armature bearing 66 carried by the die cast frame member 48 and a lower armature bearing 67 which is supported by a lower frame member 68. The lower frame member 68 is somewhat V-shaped, supporting the bearing 67 at the apex and the brush assemblies 63 adjacent thereto with the upwardly extending legs thereof secured by screws 69 to the field 60 and the die cast frame member 48 as is best shown in FIG. 4, it being understood that only the lefthand portion of the lower frame member 68 is shown while the cut-away portion on the right is identical thereto.

The reduction gear train 47 is located within the pocket or recess 49 formed in the die cast frame member 48 as explained above. This gear train 47 includes a helical gear 70 formed integrally with the armature shaft 62, a large mating spur gear 71 which is attached to and turns with a small spur gear 72 which drives a large spur gear 73 as shown in FIGS. 4 and 6. The spur gear 73 is threadedly received on the lower end of a short cylindrical output shaft 74. The small spur gear 72 is made integral with a stub shaft 75 which is journaled for rotation at its lower end in the frame member 48 and at its upper end in a cover 76 which forms with the frame member 48 an enclosure 77 for the gear train 47.

The cover 76 supports a sleeve bearing which journals the output shaft 74. The output shaft 74 supports at its upper end a coupling member 78 which includes a plurality of peripherally disposed sloping drive lugs 79 adapted for engagement with a suitable coupling member on the mixing head 26 to drive the beaters 28.

The output shaft 74, as noted below, is of cylindrical shape and has located coaxially therewith the armature shaft 62. The upper end of the armature shaft is provided with a portion of reduced diameter which is threadedly received in the lower end of a coupler 80 which, at its upper end, supports the blender drive shaft 81. The blender drive shaft 81 is provided with a square cross section so that it may engage a suitable coupling member to drive a blade assembly 83 mounted in the bottom of the blender vessel 22. The blade assembly 83 includes the usual sharp blades which are rotated to agitate the liquid contained in the blender vessel 22 and chop and liquify any solids contained therein. In the conventional manner, the blender vessel 22 has a base portion 84 which is tapered so as to engage and be supported by a ring 85 which is secured by screws 86 to the upper wall of the power unit housing 44.

As was explained and described above in connection with the mounting of the motor and gearing assembly 45, the resilient or spring washers 56 and 57 associated with the mounting bolts 54 shown in FIG. 7 permit the assembly 45 to shift horizontally so that the armature shaft 62 with the associated coupler 80 and drive shaft or member 81 may properly align itself with the blade assembly 83 which it is driving.

The power unit housing 44 and the associated base 32 are formed of a molded plastic material. Because of the forces applied to the base 32 when the appliance 20 is used in its various modes, particularly in connection with the grinding of meat, it is necessary that means be provided to make the base 32 as rigid as possible to prevent deflection of the laterally extending portion with respect to the housing 44. In connection with the accomplishing of this objective, molded ribs are provided in the bottom of the base 32 and in addition, the closure plate 88 is formed to be a structural member to make the base 32 more rigid. As is shown in FIGS. 4 and 13, the closure plate 88 is formed with an upwardly extending peripheral wall 89 which terminates in an outwardly extending lip 90. The central portion of the closure 88 is formed with strengthening ribs 91 and a circular depression 92 to locate and position the air baffle 59. In the area of the circular depression 92, there are provided a plurality of holes 93 through which the cooling air enters the housing 44 passing upwardly across the motor 46 and the gear enclosure 77 and being discharged through openings in the top of the housing 44.

The power unit 24 is supported on four rubber feet 94 which are located at the corners of the base 32 with the two adjacent the motor 46 being secured to the closure plate 88 while the outermost two are secured to the molded plastic base 32. The closure plate 88 is fairly rigid as a consequence of the peripheral wall 89 and the ribs 91. The plate 88 is suitably secured to the housing 44 and base 32 by self-tapping screws so that the lip portion 90 engages the plastic at enough places to provide substantial rigidity. Even so, there is some tendency for the base 32 to flex when the pressure is applied in connection with the food grinding attachment 38. To prevent breakage and overcome this tendency, there is provided a pair of molded plastic projections 95 as are shown in FIG. 4. These projections are normally spaced slightly above the supporting surface and do not engage until there is some deflection of the base 32 as a consequence of force being applied to the food grinder attachment 38, for instance.

The motor 46 is a fairly conventional series wound AC/DC motor which rotates at approximately 18,000 RPM under no load condition. This speed provides a suitable top speed for the blender operation. Suitable field taps are provided to decrease the speed in order to obtain output speeds for the blender of on the order of 8,000 to 18,000 RPM. These speeds are, of course, far in excess of the speed required for operating a mixer or a meat grinder attachment. Accordingly, the reduction gear train 47 provides a substantial reduction on the order of 72 to 1. This provides a maximum output shaft rotation for the shaft 74 of on the order of 250 RPM under no load conditions.

Turning now to the mixing head 26, which is driven by the output shaft 74 through the coupling member 78, we note in FIGS. 2 and 8 that the mixing head 26 bears some resemblance to the body of a conventional food mixer having an elongated housing 100 which is provided with a handle 101 and a beater ejector button 102 located at the forward end thereof. The major difference between the mixing head 26 and the conventional food mixer, of course, is the fact that there is no motor enclosed in the housing 100. The housing 100 is defined by base casting 103 and an upper plastic cover 104. The shape and contour of the base casting or frame 103 is evident from FIGS. 8, 9 and 14. It is a generally elongated, flat member having a forward bottom wall 103a in which are formed upwardly extending bosses 103b in which the mixer spindles 105 are journaled. Located forwardly of the bosses 103b and defining the front wall of the housing 100 is a wall 103c on the base casting 103.

Extending downwardly and rearwardly from the front bottom wall 103a is a step 103d which connects to a rear bottom wall 103e. Rearwardly of the spindle supporting bosses 103b, there is provided a boss 103f in which a stub shaft 106 is received. The shaft 106 supports on its upper end a molded plastic gear member 108 having a large upper spur gear 108a and a smaller lower spur gear 108b. The uppermost spur gear 108a is positioned in driving engagement with one spindle gear 109 which in turn is in driving engagement with the other spindle gear 109. The gears 108a, 108b and spindle gears 109 make up part of a gear train 110 which delivers power from the previously described coupling member 78 on the power unit 24 to the beaters 28. The input gear of this gear train 110 is a gear member 111 which is formed with an outermost spur gear 111a and a centrally disposed somewhat recessed bevel gear 111b.

For the purpose of rotatably mounting the gear member 111 and for interconnecting the gear train 110 to the coupling member 78, there is provided a shaft 112 which carries on its lower end a drive cup 113. The drive cup 113 is a small inverted cup-shaped member having its outer walls formed with a plurality of peripherally disposed driving lugs 113a which mate with the corresponding lugs on the coupling member 78 and drivingly interconnect the two coupling members to transmit power between the output shaft 74 of the reduction gear train 47 and the gear train 110 in the mixing head 26. The drive cup 113 is retained on the shaft 112 and restrained from relative rotation by a hex nut which is threadedly received on the end of the shaft 112 and is received in a hexagonally shaped recess 113b formed in the drive cup 113 as is best shown in FIG. 8. As is also obvious from FIG. 8, the drive cup 113 is shaped so that it provides clearance for and is out of contact with the blender drive shaft 81 which will, of course, be continuously rotating when the power unit 24 is operating.

The support of the shaft 112 in the mixing head 26 is accomplished by means of a journal bearing which is press-fitted in a cylindrical boss 103g formed in the base casting 103. Thus, when the drive cup 113 is rotated as a consequence of engagement with the coupling member 78, the shaft 112 rotates the gear member 111 having the spur gear 111a which in turn rotates the gear member 108 by virtue of its engagement with the spur gear 108b. The spur gear 108a then rotates the two spindle gears 109. These two sets of spur gears 111a, 108b and 108a, 109 provide a speed increase from the output shaft 74 and its coupling member 78 to the spindles 105 and the beaters 28. As was stated above, the coupling member 78 rotates at a maximum speed of on the order of 250 RPM. The gear train 110 increases the speed by a factor of 3.32. Thus, the maximum beater speed is on the order of 800 RPM under no load conditions. As will be explained in greater detail below, the motor 46 is provided with field taps so as to permit reduction of the motor speed to achieve speeds for the beaters 28 which are substantially less, as is, of course, necessary in connection with a food mixer.

As was noted above, the gear member 111 is formed with a small recessed bevel gear 111b. The bevel gear 111b is drivingly engaged with a bevel gear 114 which is supported for rotation on a power take-off shaft 115 disposed at right angles to the shaft 112. The shaft 115 is supported on the base casting 103 by means of an upstanding post 103h which has formed at its upper end a generally tubular portion 103i. As may best be seen in FIGS. 8 and 14, the tubular portion 103i has a portion of reduced diameter 103j within which a bearing 116 for the shaft 115 is provided. Immediately adjacent to the portion 103j of the tubular portion 103i, there is provided a recess 103k of enlarged diameter which is designed to receive the mounting portion of the food grinding attachment 38. Extending through the wall of the tubular portion 103i into the recess 103k is a threaded opening 117 which is adapted to receive a set screw of thumb screw 118 threaded into engagement with the mounting portion of the food grinding attachment 38 to retain it in place as shown in FIG. 3. As so mounted with respect to the mixing head 26, the conventional feed screw in the food grinding attachment 38 is drivingly engaged by the outer end of the power takeoff shaft 115.

To achieve a desirable rate of operation by the food grinding attachment 38, it is desirable that the feed screw contained therein be driven at the rate of approximately 150 RPM under no load conditions. To achieve this rate of rotation in the power takeoff shaft 115, the bevel gears 111b and 114 are designed to produce a speed reduction of a ratio of 1.5 to 1. Thus, in transmitting power from the gear member 111 in the mixing head 26 to the food grinding attachment 38, there is a speed reduction while in transmitting power to the beaters 28, there is a speed increase.

The mixing head 26 is mounted on the same support ring 85 as is employed to support the blender vessel 22. The base casting 103 as described above is formed with bottom wall 103e which is of substantially the same general shape when viewed from above as the support ring 85 being generally square but with the sides curved slightly as is evident from FIG. 1. Thus, when the mixing head 26 is assembled to the power unit 24, the bottom wall 103e of the mixing head 26 rests on the upwardly facing portion of the support ring 85. Because of the forces acting on the mixing head 26 during normal operation, it is necessary to provide retaining means to secure the mixing head 26 in assembly relation with the power unit 24. In order to accomplish this retaining of the mixing head 26 with respect to the power unit 24, there are provided connecting means 119 including support brackets 120 clamped between the support ring 85 and the housing 44 of the power unit and is best shown in FIG. 4. The brackets 120 which are generally U-shaped have mounting portions 120a formed at the center portion thereof which are sandwiched between the ring 85 and the housing 44 with the assembly screw 86 extending therethrough as shown in FIG. 4. Outwardly projecting arms 120b of each support bracket 120 comprise spaced parallel plates which at their outer ends support a bar or pivot pin 121 which is welded to the arms 120b and for the purpose of terminology will be considered part of the support bracket 120. The support brackets 120 are substantially identical extending from diametrically opposite edges of the support ring 85. The only difference between the support brackets 120 is the fact that the bracket extending toward the bowl turntable 34 or the laterally projecting of the base 32 has a notched-out portion 120c in both of its arms 120b which provides or permits limited movement of the mixing head 26 when it is in its position for food mixing as shown in FIG. 2. The support brackets 120 are concealed to a large extent by shroud portions 85a which are formed from the support ring 85 and extend outwardly along the sides of the support brackets and leave exposed only the pivot pins 121.

In order to provide means for pivoting the mixing head 26 with respect to the pivot pins 121, the base casting 103 is formed with a channel-shaped post 103r which extends downwardly at the end of the mixing head 26 from the bottom wall 103e. As shown best in FIG. 14, the side walls of the channel 103r are formed with downwardly facing recesses 103m which are designed to receive the pivot pin 121 therein. In order to support the mixing head 26 for limited pivotal movement about the pin 121, a pivotally mounted retainer 122 is mounted in the channel defined by the post 103r as is best shown in FIG. 8. The retainer 122 has a hook-shaped portion 122a at the lower end thereof which extends beneath the pin 121 and cooperates with the recesses 103m to pivotally connect the mixing head 26 to pin 121 and thus to the power unit 24. A pivot pin 123 having its ends received in the spaced walls of the channel-shaped post 103r extends through an opening in the retainer 122 to accomplish the pivotal support. A spring 124 is wrapped around the pin 123 with one end bearing on the base casting 103 and the other end engaging the retainer 122 and being tensioned to bias the retainer 122 counter-clockwise as shown in FIG. 8 so that the hook 122a engages the pin 121. The retainer 122 is provided with a portion 122b which extends outwardly of the channel-shaped recess in post 103r and which is manually operated to rotate the retainer clockwise as viewed in FIG. 8 to disengage the hook 122a from the pin 121, permitting the mixing head 26 to be disassembled from the power unit 24.

Although it is contemplated that the mixing head should be pivotal about the pin 121 to which it is connected in FIG. 8 to lift the beaters 28 out of the mixing bowl 30, there are instances in which it is desirable to restrain the mixing head 26 from moving out of the horizontal position shown in FIG. 8. This function is performed by latch member 125 which is of generally T-shaped configuration as shown in profile in FIGS. 10, 11 and 12. The latch member 125 is pivotally supported on base casting 103 by a pin 126 which is supported in downwardly facing trunnions cast integrally with the base casting 103. The latch member 125 has a downwardly extending leg 125a which is recessed on the side toward the support bracket 120 so as to receive the support bracket partially therein. The recessed, inner face of leg 125a is formed with two upwardly facing wall portions 125b (one of which is shown in FIG. 8) which are intended to engage the spaced arms 120b of the support brackets 120. As shown in FIG. 8, there is a small space between the upper edges of wall portions 125b and the arms 120b of the support bracket 120. This is a consequence of the notch 120c in the arms 120b of the bracket 120 disposed toward the turntable 34. This permits the mixing head 26 to have a limited amount of pivotal movement during the mixing operation which is regarded as desirable to prevent jamming and problems with the food mixing.

The latch member 125 is biased in a clockwise direction as shown in FIG. 8 to its latched position engaged over the support bracket 120 and its pivot pin 121. This biasing is accomplished by spring 128 which is wrapped around the pivot pin 126 with one end engaging the base casting 103 and the other end engaging the latch member 125 as shown in FIG. 8. As best shown in FIGS. 9, 10 and 14, the latch member 125 has a pair of rearwardly extending leg portions 125c which extend into the interior of the mixing head 26 through slots or openings 103n in the base casting 103 as shown in FIGS. 9, 10 and 14. Connected to the rearwardly extending ends of leg portions 125c are link levers 130 which are pivotally mounted with respect to the base casting 103 by pins 131 which also pivotally mount stop levers 132. The purpose of the link levers 130 is merely to interconnect the stop levers 132 with the latch member 125 with a type of lost motion connection. As may be seen in FIGS. 10 through 12, the stop levers are somewhat pie-shaped in appearance being pivoted in the slots 103p in the base casting 103. The link levers 130 each include at their ends remote from the pivot pin 131 a bifurcated portion 130a which receives the rearwardly extending end of one of the leg portions 125c of the latch member 125. Thus, as the latch member 125 is pivoted counterclockwise as shown in FIGS. 10, 11 and 12 by pressing upwardly on a forwarding extending portion 125d, the link levers 130 are pivoted clockwise to the position shown in FIG. 12. The link levers 130 each include an outwardly extending lug 130b which engages a forwardly projecting lug 132a on the stop levers 132. Thus, as the link levers are pivoted clockwise from the position shown in FIG. 11 to the position shown in FIG. 12, the stop levers 132 are also pivoted clockwise.

As shown in FIG. 11, the purpose of the stop levers 132 is to engage the upper surface of the support ring 85 when the mixing head 26 is raised to its inclined position and to retain automatically the mixing head 26 in such position. As the mixing head is raised to a point where the stop levers 132 clear the ring 85, gravity causes the stop levers 132 to rotate counterclockwise as shown in FIGS. 10 through 12 until projections 132b swing into engagement with base casting 103 to prevent further movement. After the stop levers 132 have pivoted to the position shown in FIG. 11, release of the mixing head 26 allows the stop levers 132 to engage ring 85. In this position the force acting upwardly on stop levers 132 is to the right of pivot pin 131 as shown in FIG. 11 causing the stop levers 132 to be urged counterclockwise so that they hold the mixing head 26 in this inclined position. When it is desired to return the mixing head to its horizontal or operative position, finger pressure is applied to portion 125d of the latch member 125 thus causing the stop levers 132 to be pivoted slightly so that further force applied to the stop levers 132 is to the left of the pivot pin 31 causing the stop levers 132 to be rotated clockwise and into the housing of the mixing head 26 thus allowing the mixing head 26 to pivot to the horizontal position. As the mixing head moves into the horizontal position, it should be noted that the rounded upper edge of the shrouds 85a which enclose the support brackets 120 cam the latch member 125 in a counterclockwise direction to permit the latch member 125 to pass over and then snap into a retaining engagement as exemplified by the portion shown in FIG. 8. It should also be noted that the lower edge of the leg 125a of the latch member 125 is beveled to facilitate this camming action as the mixing head 26 is moved from its upwardly angled position to its horizontal use position.

In order to maintain the general appearance of a food mixer when the appliance 20 is used with the mixing head 26, the cover 104 is formed with a skirt portion 104a which extends downwardly below the level of the base casting 103 in order to enclose the support ring 85. As is evident from FIGS. 2 and 3, the skirt portion 104a extends substantially around three sides of the ring 85 and is positioned with the lower edge thereof substantially level with the lower edge of the ring 85 as is shown in FIG. 8. Thus, when the appliance 20 is being used with the mixing head 26 as shown in FIG. 2, it has the general appearance of a food mixer since the mounting ring 85 characteristically associated with a blender has been essentially enclosed by the skirt portion 104a. From the consumer's standpoint, therefore, the multipurpose appliance 20 in its various modes of use has the appearance and the functions of the various individual appliances which it replaces, thereby adding to the overall appeal of the appliance.

When the multi-purpose appliance is to be used for grinding or chopping meat, it is assembled in the manner shown in FIG. 3. In accomplishing this objective, the mixing head 26 is assembled to the power unit 24 in the reverse position of that shown in FIG. 8. This results in the retainer 122 being locked into engagement with the right one of the two pivot pins 121 as viewed in FIG. 8 while the latch member 125 engages the left one of the support brackets 120. There being no cut-out portions 120c associated with this bracket 120, the upwardly extending walls 125b in the leg 125a engage the arms 120b of the support brackets 120 and restrict the mixing head 26 to minimal pivotal movement with respect to the power unit 24 until the latch member 125 is actuated to disassemble the parts.

In order to facilitate removal of the beaters 28 from the spindles 105, there is provided a beater ejector mechanism including a slide member 135 which is formed at its upper end with the beater ejector button 102. The slide member 135 is of somewhat inverted Y-shaped configuration having downwardly extending legs 135a and 135b which extend into openings in the beater spindles 105 to engage the upper end of the beaters 28 and dislodge them from their engagement with the spindles 105 in a manner known in the art. To support and guide the beater ejector in its sliding movement into and out of engagement with beaters 28, a plate 136 is mounted thereon by securing it to the base casting 103. The plate 136 has spaced holes which receive the downwardly projecting legs 135a and 135b of the slide member 135. Integrally molded with the slide member 135 are retainers 135c which extend through and lock beneath a displaced portion 136a of the plate 136. A spring 137 acting between the plate portion 136a and the slide member 135 biases the slide member upwardly. The cover 104 is formed with an opening 104a through which the upper end of the slide member 135 extends thereby exposing the beater ejector button 102 for manual actuation. Thus, the sliding movement of member 135 is guided by the opening 104a in the cover 104 and the openings provided in the plate 136 which receive the legs 135a and 135b. The slide member 135 is biased upwardly by the spring 137 while the retainers 135c keep the slide member in assembled relation to the plate 136.

For a better understanding of the operation of the appliance 20, reference should be had to the circuit diagram of FIG. 14 as well as the perspective drawings of FIGS. 1, 2 and 3. The appliance 20 is provided with a power cord designated generally by reference numeral 133, one side of the power cord being connected through an on-off switch 138 which permits selection of a steady "on" condition or a pulse condition of operation using a button operated normally open switch. The controls for the switch 138 take the form of the two buttons on the upper left portion of the control panel for the power unit 24. A button 139 operates a normally open switch which is closed only while the button is depressed. A button 140 operates the switch 138 to close the circuit to the motor 46 of the power unit 24 for continuous operation until the switch is opened by depressing the button 139 and releasing it. The controls for the power unit 24 also include a selector switch 141 which is controlled by a rotatable knob 142 as shown in the drawings of FIGS. 1, 2 and 3. The selector switch 141 provides means for selecting various speed and power ranges for the operation of the power unit 24. The manual control knob 142 is provided with an indicator 143 which cooperates with indicia for the various alternative settings for the knob 142. As shown in FIG. 15, these settings are "LO", "HI" and "POWER". These various settings connected the motor 46 in circuit with various portions of field winding 144.

The field winding 144 is shown schematically in FIG. 15 as including coil sections 144a, 144b, 144c, 144d, 144e and 144f. The selection of the coils 144b – 144e is accomplished by means of the push button switch 145 having push buttons 145a, 145b, 145c, 145d and 145e. In considering the circuit connections of the various modes of operation of the switch 141, we shall consider first the power setting in which the control knob 142 is rotated to the maximum extent in the clockwise direction. As shown in FIG. 15 in such a setting, the motor 46 is connected with the armature 61 in a series with only the coil 144f. This arrangement provides the maximum power and is the mode for operating the power unit 24 when the appliance 20 is utilized with the food grinding attachment 38 or other attachments.

When the power unit 24 is to be operated as either a blender using the vessel 22 or as a mixer using the mixing head 26, it is desirable to have available a wide variety of speeds of operation. The push button switch 45 includes a total of five push buttons permitting the user to select any one of five different speeds by connecting in circuit one or more of the serially connected coils 144b – 144f. Thus, after the selector switch 141 is positioned in the intermediate setting with indicator 143 adjacent the "HI" indicia and the push button 145e is depressed, the coil 144f is connected in series with the armature 61 in essentially the same circuit arrangement as when the selector knob 142 is set on the "POWER" setting. While still in the "HI" setting, however, the user may depress any of the other buttons 145d, 145c, 145b or 145a connecting progressively more coils in series with the armature and resulting in progressively slower speeds. To obtain a second set of five additional speeds, which are lower than any of those obtained with the selector switch on the "HI" setting, the knob 142 is rotated in a counterclockwise direction to a position with the indicator 143 adjacent to the "LO" indicia. This setting connects the additional coil 144a in series with the push button switch 145. The field coils are designed so that when the switch 142 is in the "LO" setting, the maximum speed, which is achieved by depressing the button 145e, is slightly less than the speed achieved in the "HI" setting when the button 145a is depressed. This provides a complete range of ten speeds for use in operating the appliance 20 as a blender or a mixer. The speed ranges achieved for blending operation will be on the order of 8,000 to 18,000 RPM for the blade assembly 83 and from 300 to 830 RPM for the beaters 28 when utilizing the mixing head 26 under no load conditions. Thus, the controls for the power unit 24 are simple and easy to operate requiring few changes to adapt the power unit 24 to operate in its various modes. By having a separate setting for the food grinding attachment 38 as indicated above as the "POWER" setting on the switch 141, the user is assured full power while using the food grinding attachment and is protected against the risk of burning out the motor 46 while operating on one of the lower speed settings.

The appliance 20 as is clear from the above description may be easily and conveniently operated in any of its three alternative modes. The blender vessel 22 rests on the power unit 24 supported by the ring 85 as is conventional in any food blender. The food head 26 is pivotally connected to one of the support brackets 120 in much the same way as any conventional stand supported mixer which might include a motor enclosing head connectable to a base support column. The meat grinding attachment 38 assembles simply and easily to the mixing head 26 by merely operating the thumb screw 118 which represents a common or usual means of attaching a food grinding attachment to its power supplying base. It is further contemplated that additional attachments such as are used in connection with both food grinders and with blenders might be associated with the appliance 20. The inherent capacity for convenient connection of attachments which are to be driven at various speeds or requiring various power is provided in the power unit 24 and the mixing head 26. For instance, there are disclosed in the art, ice crusher attachments for blenders which could be associated with and connected to the power unit 24. In addition, there are vegetable slicers and shredder attachments to be driven by a meat grinder power head; such attachments could be associated with and driven by the power take-off shaft 115 of the mixing head 26.

While there has been shown and described two specific embodiments of the present invention, it will be apparent to those skilled in the art that various changes and modifications may be made without departing from the invention in its broader aspects, and it is, therefore, contemplated in the appended claims to cover all such changes and modifications as fall within the true spirit and scope of the present invention.

What is claimed as new and desired to be secured by Letters Patent of the United States is:

1. A power unit for a food preparation appliance comprising a housing having side walls and a top wall, attachment support means fastened to said top wall of said housing to receive and support various alternatively usable attachments which are to be driven by said power unit, a motor enclosed within said housing including an armature carried by a shaft, said shaft being journaled by upper and lower armature bearings, a laminated field, commutator means supported on said armature shaft, a combined upper frame member supported within said power unit housing from the top wall thereof, said upper frame member supporting said laminated field and said upper armature bearing, a lower frame member supported by said upper frame member, said lower frame member supporting said lower armature bearing and commutator brushes in engagement with said commutator means, assembly means mounting said upper frame member in said housing to permit relative movement between said motor and said housing to obtain alignment of said motor and gearing assembly with said attachment support means, said upper frame member being formed with a recess within which reduction gearing is enclosed, said shaft extending into said recess into driving engagement with said reduction gearing and having coupling means extending through said top wall to provide a high speed output shaft, said reduction gearing having a low speed output shaft which is concentric with and surrounds said high speed output shaft, said high speed output shaft having a speed on the order of 18,000 RPM and said low speed output shaft having an output speed on the order of 250 RPM.

2. The combination of claim 1 including a fan supported and driven by said armature shaft to circulate cooling air upwardly across said motor and said upper frame member, said power unit housing having a bottom wall with openings formed therein beneath said motor and a cylindrical baffle surrounding said fan and directing said cooling air across said armature, said laminations and said upper frame member to cool said motor and said gearing.

3. The combination of claim 1 wherein said recess in said upper frame member faces upwardly and said reduction gearing and low speed output shaft are mounted therein with a closure plate overlying said upper frame member, said closure plate and said upper frame member forming an enclosure for said reduction gearing, said power unit housing having posts extending downwardly from said top wall to support said upper frame member with respect to said power unit housing, said assembly means operating between said posts and said combined motor frame and gear housing permitting relative movement between said motor and said power unit housing to obtain alignment of said high and low speed shafts with respect to said attachment support means.

4. The combination of claim 3 wherein said low speed output shaft is cylindrical and is journaled on said closure plate, a gear shaft having its lower end journaled in said upper frame member and its upper end journaled in said closure plate, a gear formed on said armature shaft which drives gearing on said gear shaft which in turn drives a gear on said output shaft.

5. The combination of claim 1 wherein said power unit housing is formed of molded plastic material, said power unit housing being of generally inverted cup shaped configuration and having a laterally projecting platform extending from one of said side walls at the lower edge thereof, said laterally projecting platform forming a bowl support, a separate bottom wall for said power unit housing closing the bottom opening in said cup shaped housing and extending beneath said laterally extending platform to provide support therefor, said bottom wall comprising a sheet metal member with upwardly turned peripheral edges and ribs formed thereon to provide rigidity.

* * * * *